Nov. 25, 1947.   W. S. LANDON   2,431,570
EXPANSIBLE CHAMBER MOTOR WITH FLUID ACTUATED
PILOT CONTROLLED DISTRIBUTING VALVE
Filed Dec. 27, 1943   5 Sheets-Sheet 1

FIG. I

INVENTOR.
Walter S. Landon
BY John L. Stoughton
his Attorney

Nov. 25, 1947. W. S. LANDON 2,431,570
EXPANSIBLE CHAMBER MOTOR WITH FLUID ACTUATED
PILOT CONTROLLED DISTRIBUTING VALVE
Filed Dec. 27, 1943 5 Sheets-Sheet 3

INVENTOR.
Walter S Landon
BY John L. Stoughton
his attorney

Nov. 25, 1947.  W. S. LANDON  2,431,570
EXPANSIBLE CHAMBER MOTOR WITH FLUID ACTUATED
PILOT CONTROLLED DISTRIBUTING VALVE
Filed Dec. 27, 1943  5 Sheets-Sheet 4
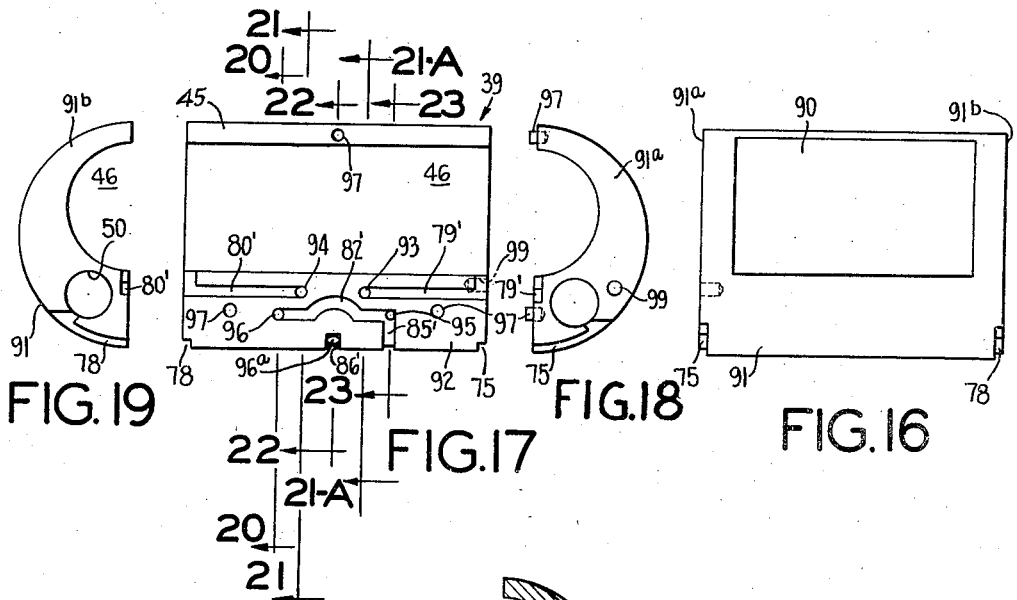
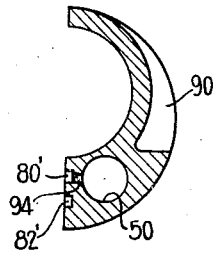
FIG. 21
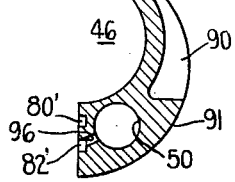
FIG. 20
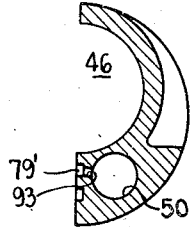
FIG. 21-A
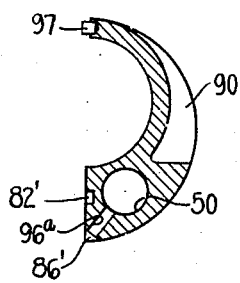
FIG. 22
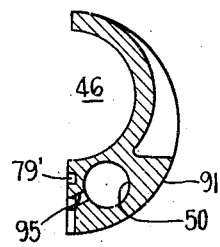
FIG. 23
INVENTOR.
Walter S. Landon
BY John L. Stoughton
his attorney Patented Nov. 25, 1947

2,431,570

UNITED STATES PATENT OFFICE 2,431,570

EXPANSIBLE CHAMBER MOTOR WITH FLUID ACTUATED PILOT CONTROLLED DISTRIBUTING VALVE

Walter S. Landon, Detroit, Mich.; Marion E. Landon administratrix of said Walter S. Landon, deceased Application December 27, 1943, Serial No. 515,845

9 Claims. (Cl. 121—158)

This invention relates generally to fluid pressure actuators and is particularly adapted among other uses to drive a reciprocating member.

One object of the invention is to provide a fluid-actuated mechanism for driving a reciprocating member.

Another object is to provide in such a mechanism, means for controlling the operation of the reciprocating member.

Another object is to provide a fluid actuator for driving a vehicle accessory such as a windshield wiper.

Another object is to provide an actuator which will vary the frequency of reciprocation without affecting the speed of movement of the reciprocating member.

Another object is to provide a mechanism which will automatically shorten the length of its stroke upon an increase in resistance to movement.

Another object is to provide for a fluid-actuated piston, a valve means to control its reciprocation, and which is mechanically independent of the piston.

Another object is to provide a mechanism which will continue to reciprocate even though it is prevented from moving throughout its normal range.

These and additional objects will be apparent from a reading of the following specification and the appended claims.

The invention consists in the improved construction of and combination of parts, to be more fully described hereinafter, and the novelty of which will be particularly pointed out and distinctly claimed.

In the accompanying drawings, to be taken as a part of this specification, there is fully and clearly illustrated a preferred embodiment of the invention, in which drawings.

Figures 7, 9:
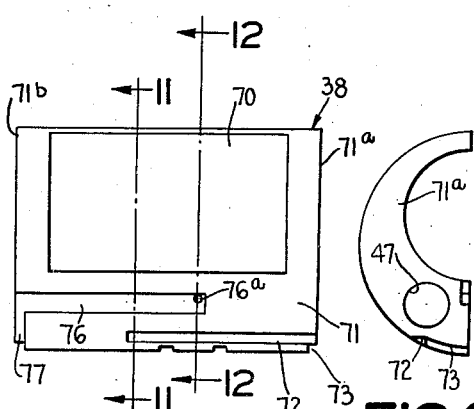
Figure 7 is a view in elevation of one of the semi-cylinders of the actuator.
Figure 9 is a left end view of Fig. 8.
Figures 8, 10:
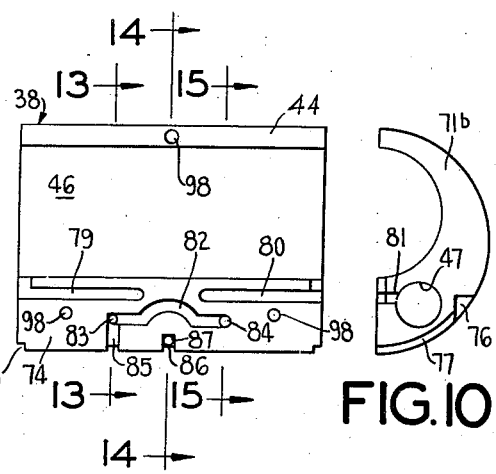
Figure 8 is a view of the opposite side of this semi-cylinder.
Figure 10 is a right end view of Fig. 8.
Figure 11:
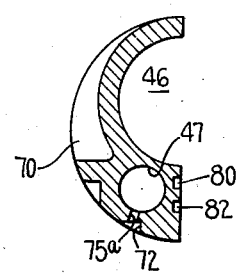
Figure 12:
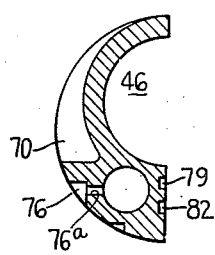
Figure 13:
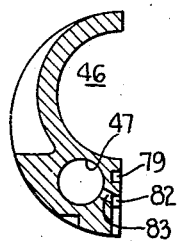
Figure 14:
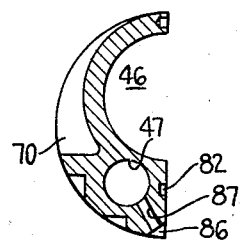
Figure 15:
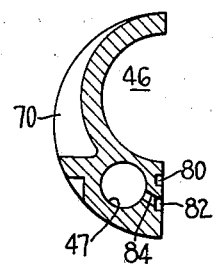

Figures 11 and 12 are views taken substantially along the lines 11—11 and 12—12 respectively of Fig. 7 and looking in the direction of the arrows;

Figures 13, 14 and 15 are views taken substantially along the lines 13—13, 14—14, and 15—15 respectively of Fig. 8 and looking in the direction of the arrows;

Figure 16 is a view in elevation of the other of the semi-cylinders of the actuator;

Figure 17 is a view of the opposite side of the semi-cylinder of Fig. 16;

Figure 18 is a right end view of Fig. 17;

Figure 19 is a left end view of Fig. 17;

Figures 20, 21, 21ª, 22 and 23 are views taken substantially along the lines 20—20, 21—21, 21ª—21ª, 22—22, and 23—23 respectively of Fig. 17 and looking in the direction of the arrows, and Figures 24, 25, 26 and 27 are diagrammatic views in section showing sequential steps of operation of the actuator.

Referring to the drawings by characters of reference, the numeral 1 indicates generally the actuator, having a downwardly extending boss or conduit conecting portion 64 and supported by means of a bracket 3 to a rigid member or support 4. A set screw 5 serves to hold the boss 64 in the bracket 3. Fluid under pressure, which in the instance shown is oil, is supplied as by an oil pump 6 and which may be the lubricating pump for a motor vehicle engine. The pump 6 has an outlet to which is connected a conduit 7 for delivering lubricating oil to the engine (not shown) and an inlet connection, to which is connected a return conduit 8 from the engine crankcase. A pressure regulating valve 8ª acts to maintain constant pressure in the conduit 7 and the excess oil is by-passed through a conduit 9 to the engine crankcase, or other suitable reservoir. A conduit 10 is connected to conduit 7 by a T connection 11 in the conduit 7 and conducts oil under pressure to the actuator boss 2. A conduit 12 is connected to the boss 64 and to a T connection 13 of the conduit 8 for flow of return oil from the actuator 1 to the pump 6, or if desired to the crankcase.

The actuator 1 has a reciprocating plunger 14 which is connected to a wire 15 of a Bowden tube 16 which is securely anchored, as by a bracket 17, secured to a suitable support 18. The other end of the Bowden tube 16 is secured to a bracket 19 of a windshield wiper mechanism 20 having a wiper blade 21 for cooperation with the motor vehicle windshield 21ª in the usual manner. The wiper mechanism 20 has an actuating portion 22 and the other end of the wire 15 is suitably attached thereto. Reciprocation of the portion 22 by wire 15 acts through rack teeth 23 and gear 24 to cause the wiper blade 21 to sweep across the windshield. In the instance shown, two mechanisms are used so that the windshield is wiped on both the driver's and the passenger's sides. One end of a wire 25 of a Bowden tube 26 is suitably attached to portion 22 and the other end is connected to an actuating portion 22' of a wiper mechanism 20' having a wiper blade 21'. The tube 26 is attached at one end to a rigid bracket 19ª of the mechanism 20 and at the other end to a bracket 19' of the mechanism 20'. It is apparent that the plunger 14 could be connected to the mechanism 20 by other means.

A rotatable control valve stem 27 of the actuator 1 is connected to a wire 28 of a Bowden tube 29. One end of the tube 29 is secured to the bracket 17 and the other end of the tube 29 is secured to a bracket 30, which may be the motor vehicle instrument panel, so that a rotatable control knob 31, secured to the other end of the wire 28, is easily reached by the driver of the vehicle.

The actuator 1 comprises a hollow tubular portion 35 which is externally threaded at either end for reception of a cap member 36 at one end, and an annular clamping member 37 at the other end. A left substantially semi-cylindrical member 38 mates with a right semi-cylindrical member 39, and the two are positioned within the portion 35. The members 38 and 39, when positioned with their flat faces 74, 92 in juxtaposition, form a cylinder which, to prevent leakage, may have a light pressure fit with the portion 35, or fit with a very small clearance.

Figure 3:
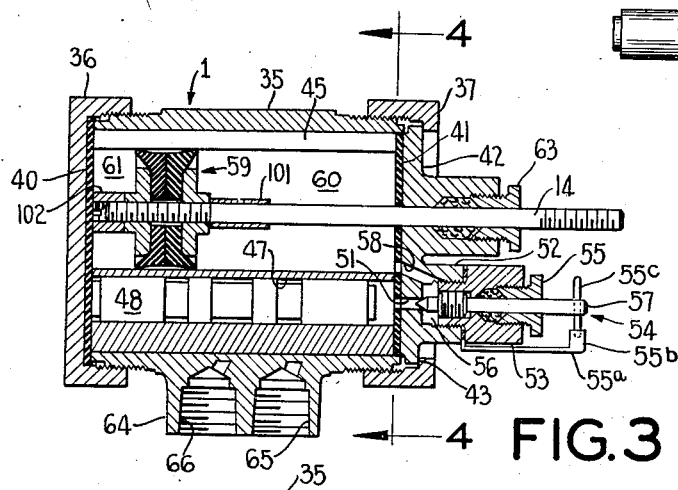
Figure 3 is a view substantially along the line 3—3 of Fig. 2 looking in the direction of the arrows.
Figure 5:
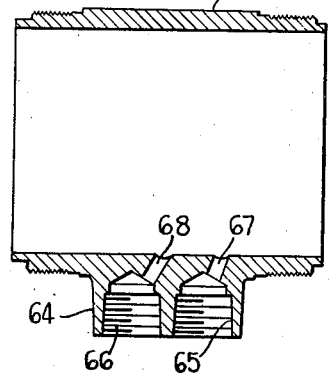
Figure 5 is a view in central vertical section of the cylindrical casing of the actuator.

A disk-like gasket 40 is clamped against the end face of the tubular portion 35 by the member 36 to form a fluid-tight seal. A second disk-like gasket 41 has an external diameter substantially equal to the inside diameter of portion 35, and is held against the end surface of the semi-cylindrical members 38 and 39 by a plate member 42. The member 42 has an outwardly extending circumferential flange 43 on the ring or clamping member 37. The member 37 acts to hold the left end (see Fig. 3) surfaces of the members 38 and 39 in a fluid-sealing relation with the gasket 40 and to compress the gasket 41 in fluid-tight relationship with the right end (see Fig. 3) surfaces of members 38 and 39 and the outer peripheral surfaces of gasket 41 into fluid-tight relationship with the inner end surfaces of the portion 35.

Each of the members 38 and 39 have semi-circular recesses in their flat faces 44, 45 respectively, which extend longitudinally thereof and register with each other to form a cylindrical cavity 46 having its longitudinal axis lying substantially in the plane of the abutting surfaces 44, 45 and somewhat above the axis of the portion 35.

The member 38 has a round hole 47 extending longitudinally therethrough which is somewhat below the recess in the face 44, and which receives a piston member 48. An identical piston member 49 is positioned within a round hole 50 extending longitudinally through the member 39, similar to the hole or piston chamber 47 of member 38. The gasket 41 has an aperture therethrough which registers with hole 47 and with an aperture 51 through the plate or cover member 42. The member 42 has a boss 52 extending outwardly from its outer face and which is hollow and is internally threaded for receiving a valve-carrying member 53 having a valve element 54 and a suitable packing and packing gland nut 55. The aperture 51 is preferably cylindrical in cross-section and opens concentrically into a chamber 56 of the hollow boss 52. The valve element 54 has a conical end portion, an enlarged externally threaded diameter portion threadedly engaging the member 53, and a stem portion 57 which extends through the packing and nut 55 externally of the actuator 1. A bracket member 55ª has one end portion clamped intermediate the member 53 and the end wall of boss 52, which serves as a seal to prevent fluid flow therebetween, and to adjustably support the bracket member 55ª. An upturned flange 55ᵇ cooperates with a cross bar 55ᶜ of the valve element 54 to limit rotation to the normal operating range of the actuator 1, as hereinafter described; it being understood that other suitable means may be used to limit the valve opening to any desired degree. Rotation of the element 54 in one direction causes its conical end portion to restrict or even prevent flow of fluid through the aperture 51, while reverse rotation will of course move the element in the opposite direction decreasing the restriction to flow between aperture 51 and chamber 56. A passageway 58 in the cover member 42 opens at one end into chamber 56 and has its other end registering with an aperture through the gasket 41 in open communication with the cylindrical cavity 46.

A double acting power piston 59 is located in the cavity 46 thereby separating the cavity 46 into right and left chambers 60 and 61. The piston 59 is an hydraulic piston of the usual type and prevents as much leakage of fluid between chambers 60 and 61 as possible, while at the same time offering not too great a resistance to longitudinal movement of the piston 59. The piston 59 has a power transmitting stem or plunger 14 which extends from the piston 59 through suitable apertures in the gasket 41 and cover member 42 and externally of the actuator 1. An outwardly extending, internally threaded, hollow boss extends from the cover member 42 concentric with the stem 14 for reception of packing and a packing gland nut 63, which prevents fluid from escaping along the stem or plunger 14 to atmosphere while at the same time allowing the stem 14 to reciprocate. The portion 35 has a radially extending boss 64 which has an inlet aperture or passageway 65 and an outlet passageway 66 opening outwardly through the boss 64. The passageways 65 and 66 are threaded for receiving the inlet and outlet conduits 10 and 12. The passageways 65 and 66 open into the hollow interior of portion 35, as at 67, and 68, respectively for cooperation with passageways in members 38 and 39.

The member 38 is more completely shown in Figs. 7 through 15 inclusive, and has a cut-away portion 70 which reduces to some extent the weight of the member 38. The curved surface 71 of the member 38 is longitudinally recessed, as at 72, substantially two-thirds the distance from the right end surface 71ª (see Fig. 7). A segmental or circumferential groove 73 is formed or cut into the surface 71ᵃ and opens at one end into recess 72. The other end opens through the flat surface 74 of member 38 and registers with a similar groove 75 in the member 39. A second longitudinal recess 76 extends along the surface 71 from the left end surface 71ᵇ of member 38 (see Fig. 7) for substantially two-thirds the length of member 38. A passageway 75ᵃ extends from the inner end of recess 72 into the chamber 47. A segmental or circumferential groove 77 is formed or cut into the end surface 71ᵇ of member 38 and opens at one end into recess 76. The other end opens through surface 74 and registers with a similar groove 78 of member 39. A passageway 76ᵃ extends from the inner end of recess 76 into hole or piston chamber 47.

Referring to Fig. 8, the surface 74 has a first L-shaped recess 79 opening into the cavity 46, opening through the end surface 71ᵃ and extending almost half-way toward the end surface 71ᵇ. At the other end, the member 38 has a second L-shaped recess 80 similar to the recess 79 and which opens into cavity 46. A recess 81 in the end surface 71ᵇ connects the recess 80 with the chamber 47. A third recess 82 in the surface 74 comprises two oppositely extending straight portions with an intermediate curved section, and serves to communicatively connect apertures 83 and 84 which open into the chamber 47 at spaced points toward the ends of member 38 from apertures 76ᵃ and 75ᵃ respectively. A recess 85 communicatively connects the recess 82 adjacent passageway 83 with the inlet passageway 65, while a recess 86 communicatively connects the outlet passageway 66 with an aperture 87 opening into the chamber 47.

The member 39 (Figs. 16 to 23 inclusive) has a cutaway portion 90, similar to portion 70; a curved surface 91, end surfaces 91ᵃ and 91ᵇ, and a flat surface 92 which is in juxtaposition with surface 74 of the member 38. This surface 92 has recesses 79', 80', 82', 85' and 86' which register with the recesses 79, 80, 82, 85 and 86 respectively of member 38 to form fluid flow passageways. An aperture 93 connects the inner end of the recess 79' with the chamber 50, while an aperture 94 connects the inner end of recess 80' with chamber 50. The recess 82' is communicatively connected with the chamber 50 by apertures 95 and 96 at opposite end portions. The aperture 95 being adjacent the intersection of recesses 82' and 85'. Passageways 75 and 78 have extending portions opening at the surfaces 91ᵃ, 91ᵇ, respectively, into the chamber 50. An aperture 96ᵃ opens at one end into cylinder 50 and at the other end into a recess 86'. To insure accurate relative positioning of the members 38 and 39 and to aid in their manufacture, dowel pins 97 secured to member 39 may be used. These pins are received in apertures 98 in the member 38. The member 39 also has a dowel pin hole 99 which cooperates with a dowel pin 100 carried by the cover member 42 and extending through an aperture in the gasket 41 to locate the relative positions of these elements.

Figure 24:
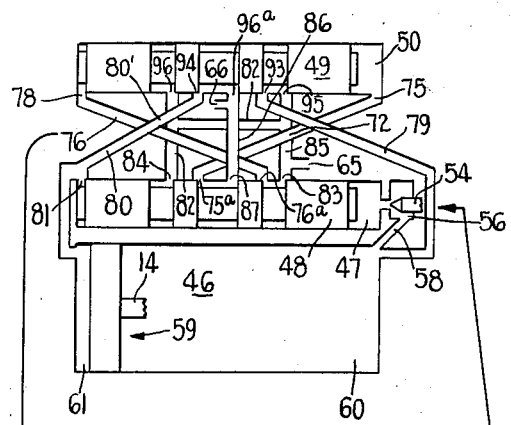

In Figs. 24, 25, 26 and 27, which show the passageway arrangement schematically, the same numerals to designate similar parts has been used as in the other figures, to more clearly relate these figures to the Figs. 3 through 23 inclusive. Fig. 24 shows the position of the parts at the start of a right power stroke. Pressure fluid is being supplied through passageway 65, recess 85, aperture 83, cylinder 47, passageway 76ᵃ, recess 76, and groove 78 into the left end of the cylinder 50. This pressure acts on the left end of piston 49 moving it toward the right; the fluid in the right end being discharged through groove 75, recess 72, passageway 75ᵃ, cylinder 47, aperture 87, and recess 86 to outlet passageway 66. Movement of the valve member 49 toward the right (see Fig. 25) opens apertures 94 and 96 to the cylinder 50 to permit fluid to flow from the inlet passageway 65 through recess 85, recess 82, aperture 96, cylinder 50, aperture 94, and recess 80 to the chamber 61. The piston 59 will be urged toward the right causing the stem 14 to push wire 15 to move the wipers 21 and 21' in one direction. The fluid from chamber 60 will exhaust through recess 79, aperture 93, aperture 96ᵃ to outlet passageway 66. At the same time pressure fluid is flowing through recess 80 to chamber 61, it will flow through recess 81 into the left end of cylinder 47 and act on the left end of member 48 urging the same toward the right. Fluid from the chamber 47 exhausts through the passageway 51, chamber 56 and passageway 58 into chamber 60, where it flows to outlet passageway 66 along with the discharge from chamber 60, as described previously.

In usual operation, the piston 59 will reach the end of its stroke prior to the complete movement of the member 48 and will remain there until the member 49 initiates the return half cycle. Movement of the piston 59 in each direction is limited by engagement of stop members 101 and 102 against gaskets 41 and 40 respectively. If desired, the gaskets may be apertured so that the members 101 and 102 engage the members 42 and 36 respectively.

Figure 26:
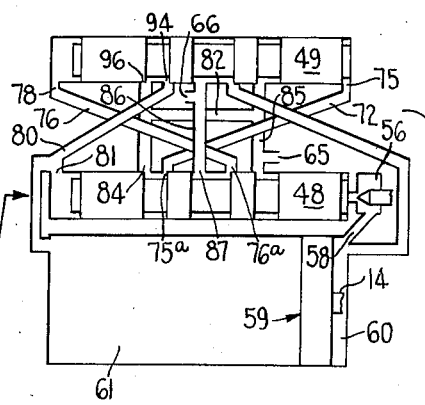
Figure 25:
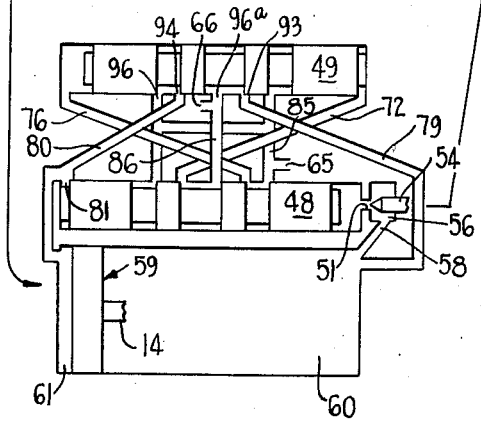

The movement of member 48 is controlled by the adjustment of valve element 54 which controls the time required for the fluid to discharge from the right end of the chamber 47. Fig. 26 shows the relationship of the parts at the instant the member 48 completes its stroke to the right, and just as the member 49 starts its movement toward the left. Pressure fluid is supplied through the inlet passageway 65, recess 85, recess 82, aperture 84, chamber 47, passageway 75ᵃ, recess 72, and recess 75 to the right end of chamber 50. This fluid will force the piston member 49 toward the left and the fluid in the left end will discharge through groove 78, recess 76, passageway 76ᵃ, chamber 47, aperture 87, and recess 86 to outlet passageway 66.

Figure 1:
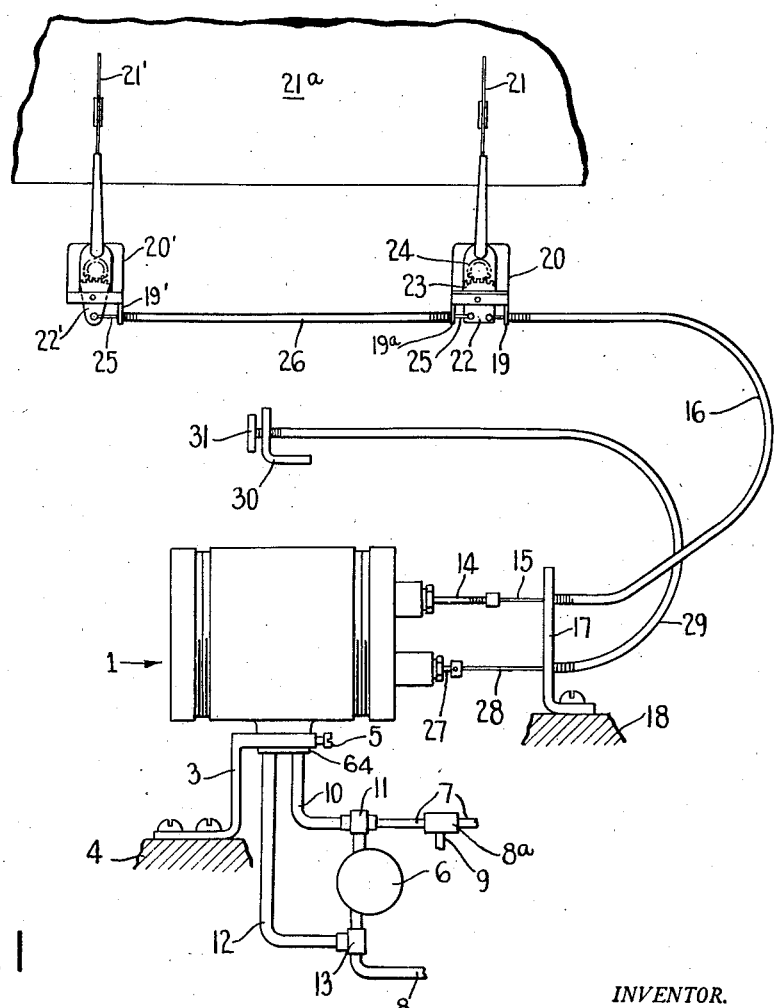
Figure 1 is a view in elevation showing an actuator embodying the invention connected to a set of windshield wipers and the control valve knob.
Figure 2:
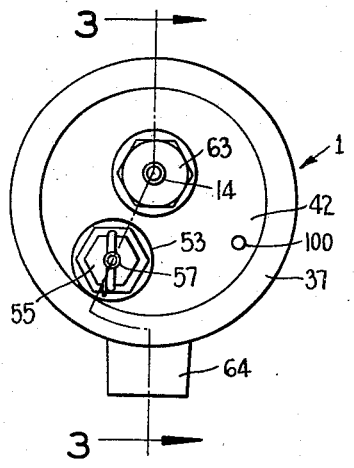
Figure 2 is an end view of the actuator taken at the control valve end.
Figure 4:
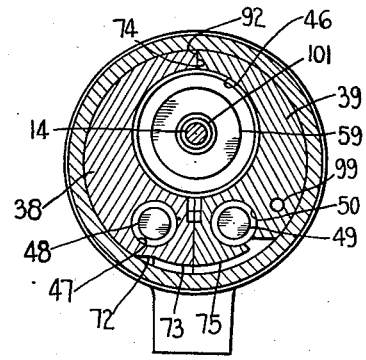
Figure 4 is a view substantially along the line 4—4 of Fig. 3 and looking in the direction of the arrows.
Figure 6:
Figure 6 is a view in elevation of one of the reciprocal valve members.
Figure 27:
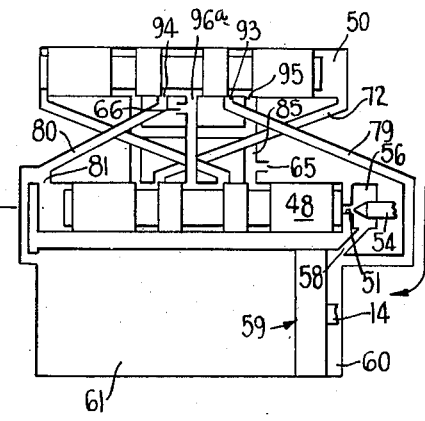

Fig. 27 shows the relationship of the parts at the instant the member 49 reaches the end of its left movement. Fluid will now flow from inlet passageway 65, recess 85, aperture 95, chamber 50, aperture 93, recess 79, into chamber 60 to move the piston 59 toward the left, moving the Bowden wire 15 and thereby moving the wiper blades 21 and 21' to wipe the windshield. Fluid from chamber 61 exhausts through recess 80, aperture 94, chamber 50 and aperture 96ᵃ to the outlet passageway 66. At the same time fluid is being supplied to chamber 60, it also flows from chamber 60 through passageway 58, chamber 56, and passageway 51 to the right end of chamber 47, causing the member 48 to move toward the left. The rate of flow of fluid through passageway 51 and consequently the movement of member 48 will be dependent upon the position of valve element 54. As shown in Fig. 1, this is controlled manually by a knob 31 within easy reach of the operator. Fluid from the left end of the chamber 47 will exhaust through recess 81, recess 80, aperture 94, chamber 50 and aperture 96ᵃ to outlet passageway 66. The parts will then be returned to the position shown in Fig. 24.

It may now be seen that with a constant fluid pressure maintained in inlet conduit 10 by the pump 6 and valve 8ᵃ, the time required and rate of sweep of the blades 21 and 21' will be constant irrespective of the setting of the valve element 54. Adjustment of the element 54 will control the time required for the complete over and back sweep of the blades 21 and 21' by regulating the time the blades remain motionless at each end of their travel. The normal operating range of the valve element 54 is from a position where the passageway 51 is barely open, to a position where the rate of fluid flow through passageway 51 is such that the piston 59 and member 48 each reach their limits of travel simultaneously, so that there is a minimum delay of movement of the blades 21 and 21' at either limit of travel. Further opening will shorten the stroke of the piston 59.

Certain other operations will be accomplished by this construction should the blades 21 and 21' tend to stick, such as would occur if ice tended to freeze the blades 21 and/or 21' to the windshield, or snow should accumulate thereon and render the blade movement difficult. In this event, the speed of operation of piston 59 would be materially lowered and even in the normal range of the setting of valve element 54, the member 48 would reciprocate more rapidly than the piston 59. In this event, the blades 21 and 21' will not move throughout the normal range but will have a less travel. Should the restriction be snow, the wiper will move until reversed by the member 47; and each cycle the blades will have more movement until finally the snow will be cleared and the wiper functioning normally. If the trouble is caused by ice, the wiper blades will be rocked back and forth until finally the blades break the ice, something like breaking a wire by bending it back and forth upon itself.

It is also comprehended that the hydraulic actuator 1 could be used wherever a hydraulic motor is desired to give reciprocal movement, and especially where it is desired to vary the length of stroke with the load, or where it is desired that the movement cease should the reciprocal member become overloaded, and yet not stop reciprocation between the overloaded limits.

What is claimed and is desired to be secured by Letters Patent of the United States is:

1. In a device of the character described, a hollow casing, a pair of mating members positioned within and substantially fitting the interior of said casing, said members having abutting surface portions, said members having a first chamber, said chamber having a portion in each of said members and passing through said surface portions, one of said members having a second chamber, the other of said members having a third chamber, said surface portions having a plurality of recesses, a plurality of passageways interconnecting at least two of said recesses and said second chamber, the other of said surface portions having a plurality of recesses so arranged that when said members are positioned within said casing said recesses will be in juxtaposition, and a plurality of passageways interconnecting at least two of said last-named recesses and said third chamber, at least one of said passageways being open to said first chamber.

2. In a device of the character described, a casing having a cylindrical chamber opening through opposite end portions thereof, a first semi-cylindrical member adapted to fit in said chamber and having a side wall, a second semi-cylindrical member adapted to fit in said chamber and having a side wall, said members when in position in said chamber with said side walls in juxtaposition substantially fitting said chamber, said members each having a cavity in its respective side wall, said cavities registering with each other to form a piston chamber, said first member having a first valve chamber, said second member having a second valve chamber, said side walls having a plurality of recesses registering with each other to form fluid flow passageways, inlet and outlet fluid flow passageways communicating with said first-named passageways, conduit means communicatively connecting at least one of said first-named passageway with said first valve means, conduit means communicatively connecting at least another of said first-named passageways with said second valve means, conduit means connecting said first and said second valve means with still other of said first-named passageways, passageways connecting the passageway which is communicatively connected to said first valve to said piston chamber, and means secured to said casing opposite end portions to seal said cylindrical chamber.

3. In a device of the character described, a casing having a cylindrical chamber opening through opposite end walls thereof, a first semi-cylindrical member adapted to fit within said chamber and having a side wall, a second semi-cylindrical member adapted to fit within said chamber and having a side wall in juxtaposition with said first-named side wall, each of said members having a semi-circular aperture in its side wall extending longitudinally of said members and registering with each other to form a cylindrical open ended piston chamber, said first member having a cylindrical valve chamber opening through its end walls and extending parallel to said piston chamber, said second member having a cylindrical valve chamber opening through its end walls and extending parallel to said piston chamber, piston valve members in each of said piston chambers, each of said side walls having recesses registering with each other to form fluid flow passageways, passageways interconnecting said last-named passageways and said piston chambers, passageways interconnecting at least two of said recess passageways with said piston chamber, and end walls for said casing so constructed and arranged as to close the ends of said piston chamber and said valve chambers.

4. In a device of the character described, a cylindrical tubular casing, a pair of semi-cylindrical elements having abutting adjacent wall surfaces and an outer cylindrical surface substantially fitting the inner surface of said casing, said elements each having a semi-cylindrical aperture extending longitudinally therethrough with its longitudinal axis of rotation lying in the plane of said surfaces, said semi-cylindrical apertures being in juxtaposition to form a cylindrical piston chamber, a power exerting piston in said piston chamber and having a thrust member extending beyond one end wall of said casing, each of said elements having a longitudinally extending chamber opening through opposite end walls of said elements, a longitudinally movable slide valve member in each of said last-named chambers of less length than said last-named chambers and having piston tight relationship with the side walls of said last-named chambers, said last-named chambers having passageways opening thereinto at spaced points, said valve members having recessed portions so constructed and arranged relative to the openings of said last-named passageways into said last-named chambers that said recessed portions upon reciprocal movement of said valve members will communicatively connect at least two adjacent passageways opening into the said chamber having the respective valve member, said last-named passageways interconnecting said last-named chambers such that one of said valve members acts to control flow of fluid to the opposite end portions of said chamber having the other of said valve members thereby to control movement of said other valve member and such that said other valve member acts to control flow of fluid to the opposite end portions of said chamber having said one valve member, means communicatively connecting the end portions of one of said last-named chambers with the end portions of said piston chamber, and end closures for said casing abutting the end walls of said elements in fluid tight relationship, one of said end closures having an aperture therethrough for receiving said thrust member.

5. In a device of the character described, a cylindrical tubular casing having open end walls, a pair of semi-cylindrical elements positioned within and substantially fitting the interior of said casing, said elements having substantially flat abutting surfaces extending diametrically of said casing and being of slightly less length than said casing, one of said surfaces being recessed, the other of said surfaces cooperating with said recesses to form fluid flow passageways, an inlet passageway opening through said casing and communicating with one of said passageways, said elements having a plurality of longitudinally extending chambers opening through opposite end walls thereof, at least one of said recesses opening into at least one of said chambers, passageways connecting at least one of said recesses with another of said chambers, a sealing gasket having a diameter greater than the internal diameter of said casing, end wall means secured to one end portion of said casing and holding said sealing gasket in fluid tight relationship with one end wall of said casing, a second sealing gasket having a diameter substantially that of the internal diameter of said casing, second end wall means pressing said second sealing gasket against the end face of said elements adjacent the other end wall of said casing and urging the end face of said elements adjacent said casing one end wall into engagement with said first-named gasket, said second gasket also having its outer periphery urged by said second end wall means into fluid tight engagement with the internal surface of said casing.

6. In a device of the character described, a casing having a chamber opening through opposite end portions thereof, a first member adapted to fit in said chamber and having a side wall, a second member adapted to fit in said chamber and having a side wall, said members when in position in said chamber with said side walls in juxtaposition substantially fitting said chamber, said members each having a cavity in its respective side wall, said cavities registering with each other to form a piston chamber, said first member having a first valve chamber, said side walls having a plurality of recesses registering with each other to form fluid flow passageways, fluid flow passageways communicating with said first-named passageways, conduit means communicatively connecting at least one of said first-named passageways with said first valve means, and means secured to said casing opposite end portions to seal said cylindrical chamber.

7. In a device of the character described a hollow casing having an open end, at least two mating members adapted to fit within said casing, a chamber extending longitudinally through said members and opening through said casing open end, a cap member for said casing open end, a piston within said chamber, and a sealing member interposed between said cap member and said mating members.

8. In a device of the character described a hollow casing having an open end, at least two mating members adapted to fit within said casing, a chamber extending longitudinally through said members and opening through said casing open end, a cap member for said casing open end, a piston within said chamber, a sealing member interposed between said cap member and said mating members, recesses in the adjacent faces of some of said members, and passageway interconnecting at least one of said recesses and said chamber.

9. In a device of the character described a hollow casing having an open end, at least two mating members adapted to fit within said casing, a chamber extending longitudinally through said members and opening through said casing open end, a cap member for said casing open end, a piston within said chamber, a sealing member interposed between said cap member and said mating members, recesses in the adjacent faces of some of said members, passageway interconnecting at least one of said recesses and said chamber, a passageway extending through said casing side wall, and a passageway in one of said members registering with said last-named passageway and connecting with one of said recesses.

WALTER S. LANDON.

REFERENCES CITED

The following references are of record in the file of this patent:

UNITED STATES PATENTS

| Number | Name | Date |
| --- | --- | --- |
| 1,952,690 | Strom | Mar. 27, 1934 |
| 2,056,776 | Evans et al. | Oct. 6, 1936 |
| 2,103,001 | Evans et al. | Dec. 21, 1937 |
| 2,165,966 | Hall et al. | July 11, 1939 |
| 2,191,356 | Snell | Feb. 20, 1940 |
| 2,236,665 | Beers | Apr. 1, 1941 |
| 2,253,617 | Griffith | Aug. 26, 1941 |
| 2,298,457 | Berges | Oct. 13, 1942 |
| 2,302,232 | MacNeil | Nov. 17, 1942 |
| 2,370,376 | Snell | Feb. 27, 1945 |
| 2,386,184 | Balsiger et al. | Oct. 9, 1945 |